United States Patent [19]

Stephenson, III

[11] Patent Number: 5,182,652
[45] Date of Patent: Jan. 26, 1993

[54] HIGH RESOLUTION THERMAL PRINTING BY IMAGING A HARD COPY IMAGE IN VERTICAL AND HORIZONTAL INCREMENTS SMALLER THAN THE PIXEL PITCH OF A VIDEO IMAGER ARRAY

[75] Inventor: Stanley W. Stephenson, III, Spencerport, N.Y.

[73] Assignee: Eastman Kodak Company, Rochester, N.Y.

[21] Appl. No.: 755,889

[22] Filed: Sep. 6, 1991

[51] Int. Cl.[5] .................. H04N 1/028; H04N 1/04; H04N 1/21; H04N 1/23; H04N 1/40
[52] U.S. Cl. ...................... 358/296; 358/486; 358/497; 358/483; 358/213.28
[58] Field of Search ............... 358/296, 471, 482, 483, 358/486, 497, 209, 212, 213.11, 213.22, 213.23, 213.26, 213.27, 213.28, 213.29

[56] References Cited

U.S. PATENT DOCUMENTS 4,607,287  8/1986  Endo .............................. 358/213.23
4,638,371  1/1987  Milch .
4,668,978  5/1987  Gokita .

*Primary Examiner*—Benjamin R. Fuller
*Assistant Examiner*—Scott A. Rogers
*Attorney, Agent, or Firm*—Raymond L. Owens

[57] ABSTRACT

An apparatus and method for generating a high resolution image for a thermal printer from a video imager having a plurality of pixels with a preselected pitch comprises dithering the video imager. The video imager is dithered at less than the pitch of the pixels and provides arrays of data representing video imager positions generated by halfstep offsets of the video imager in the horizontal and vertical directions. The halfstep movement of the video imager causes the pixels to map a new area of an image without overlap of a previously mapped area. The dithered arrays are transmitted to a thermal printer so that the printed image contains more information than is generated by a static video imager.

17 Claims, 3 Drawing Sheets

HIGH RESOLUTION THERMAL PRINTING BY IMAGING A HARD COPY IMAGE IN VERTICAL AND HORIZONTAL INCREMENTS SMALLER THAN THE PIXEL PITCH OF A VIDEO IMAGER ARRAY

FIELD OF INVENTION

This invention relates generally to a thermal imaging system, and, more particularly, to an apparatus and method for generating a high resolution thermal image from a video imager by dithering the video imager to facilitate printing of an image at a resolution higher than the resolution of standard video.

BACKGROUND OF THE INVENTION

In some conventional imagers, transparent images are sequentially scanned by projecting light through the image and onto a CCD imaging array. The signal from the CCD array is conditioned so that a video output is generated from scanned image. The images may consist of typical 35 mm slides or other forms of photographic negatives. The CCD array typically consist of photo diodes disposed in rows and columns and layed out to form an array conforming to a standard video format, such as the NTSC standard or the PAL standard, for example. The photo diodes may be covered with a color filter array of various patterns that generate color as well as luminance data. The array responds to the light from an internal light source that is projected through the image-bearing transparency and focused onto the imager. Currently, thermal printers are designed to capture the resulting video signals in a digital memory and make a thermal print. Conventional thermal printers employ analog capture circuitry responsive to the video signals and sufficient memory to store the complete signal digitally. The thermal printer then generates thermal hard copy by sequential deposition of dye donor onto a dye receiver in typical fashion.

Thermal prints are desirable, especially color prints. One weakness of the conventional methods used to generate video display and create thermal prints is that the resolution is not the best available. Typically, a 35 mm slide or negative has several times the resolution of the imager which is typically about 500×500 pixels. The resolution is optimized for video output but below the capabilities of thermal printing. A typical thermal printer in such applications uses a 6 dot per millimeter head to produce a 3×4 inch image on a sheet of receiver. Thermal printing technology does exist to double the pitch of the head to 12 dots per millimeter which will provide a significant improvement in image quality. Unfortunately, the means of printing an electronically generated image from high resolution silver halide to higher resolution thermal printing is limited by the resolution of the CCD which is in turn defined by video resolution. Accordingly, it will be appreciated that it would be highly desirable to generate a thermal print from a high resolution silver halide image.

Even though the silver halide image has extremely high resolution, the thermal print generated is limited by the resolution of the CCD display which is on the order of 500×500 pixels or so, whereas the silver halide image has a resolution which is several times greater. Imaging is performed by passing light through the transparent image onto the CCD and storing the image as a frame of data for subsequent printing by the thermal printer. What is actually on the transparent image may not be exactly what is seen by the CCD since the CCD is only seeing things up to the ability of its resolution. To get a more accurate reproduction and thereby greater resolution, the CCD has to see more.

One method of having the sensor see more is disclosed in U.S. Pat. No. 4,638,371, for Multiple Exposure of Area Image Sensor Having A Sparse Array of Elements which issued Jan. 20, 1987 to James R. Milch. Pixels of a digital image are produced by an area image sensor which includes a sparse array of elements. Each element is multiply exposed by different pixels of a light image. The light image is scanned in such a pattern between element exposures that each digital image pixel has a nearest neighbor digital image pixel that was produced by a different sensor element. By this arrangement, a high quality image can be produced from the digital image even if a sensor becomes defective. A dithered sensor is disclosed that has a plurality of positions so as to create a sub-image. The system disclosed, however, does not show an embodiment consisting of a single sensor suitable for video output. It is therefore desirable to have a dithering system using a single sensor to provide a video output.

U.S. Pat. No. 4,668,978, for Thermal Transfer Color Image Forming Apparatus With Image Color and Image Color Density Control Functions which issued May 26, 1987 to Masami Gokita, discloses a color and density mode control system for an image forming apparatus including and optical scanner and a color specifying unit for specifying the mode or colors that the apparatus is to use in making copies. Depending on the color mode selected, colors with or without halftones are used in forming copies. A color converter is also used for converting image information obtained by the optical scanner into color signals as specified by the color specifying unit. While a scanning copier is essentially described, a dithering process is used; however, the sensor is not moved. Dithering is the use of an array of pixels that are color (i/o) on or off that are selectively energized so as to create a macro pixel with greater color depth. In addition, the scanning element is a linear array that is mechanically moved in a direction perpendicular to the array of scanning elements. The image capture mechanism does not have a video output capability.

Solid state image sensors generally have a linear or area organization. An area image sensor offers the advantage of increased integration time for each element. In some applications, a large number of image pixels have to be digitized. For example, to make a high quality color print of a photographic negative, something on the order of about two million image pixels should be digitized for each color (red, green and blue) of a photographic negative to produce a high quality output print. With existing technology, typical consumer area image sensors have about 300,000 elements. Thus, each element of an area image sensor must sample a plurality of image pixels.

It is apparent that dithering is a technique to create an image of higher resolution than the sensor's normal capability. Accordingly, it will be appreciated that it would be highly desirable to use the dithering concept to obtain a high resolution thermal image from a video imager using a transparency.

SUMMARY OF THE INVENTION

The present invention is directed to overcoming one or more of the problems set forth above. Briefly summarized, according to one aspect of the present invention, a method for generating a high resolution thermal image from a video imager having a plurality of pixels with a preselected pitch comprises dithering the video imager at less than the pitch of the pixels and providing arrays of data representing video imager positions generated by partial step offsets of the video imager in the horizontal and vertical directions so that the partial step movement of the video imager causes the pixels to map a new area of an image without overlap of a previously mapped area.

The dithered arrays are transmitted to a thermal printer so that the printed image contains more information than is generated by a static video imager. Dithering the video imager facilitates generation of an electronic signal at a resolution higher than the resolution of a standard video output.

According to another aspect of the present invention, an apparatus for generating a high resolution thermal image from a video imager having a plurality of pixels with a preselected pitch comprises means for dithering the video imager at less than the pitch of the pixels and producing arrays of data representing video imager positions generated by partial step offsets of the video imager in the horizontal and vertical directions so that the partial step movement of the video imager causes the pixels to map a new area of an image without overlap of a previously mapped area.

Overlap in mapping is prevented by having sub-pitch mapping areas such that a new image area does not overlap a previously mapped image area. The sub-pitch areas are created by dithering the video imager in partial steps that are half steps. The arrays of data are sequential arrays and, when there are four sequential arrays, nonoverlapping areas can be mapped.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 3 depicts very high density data with its corresponding position in memory in the first and third columns and first and third rows.

FIG. 4 depicts high density data shifted horizontally in memory from the data of FIG. 1 and occupying the second and fourth columns and first and third rows.

FIG. 5 depicts low density data shifted vertically in memory from the data of FIG. 4 and occupying the second and fourth columns and second and fourth rows.

FIG. 6 depicts very low density data shifted horizontally in memory from the data of FIG. 5 and occupying the first and third columns and first and third rows.

DETAILED DESCRIPTION OF THE PREFERRED EMBODIMENTS

Figure 1:
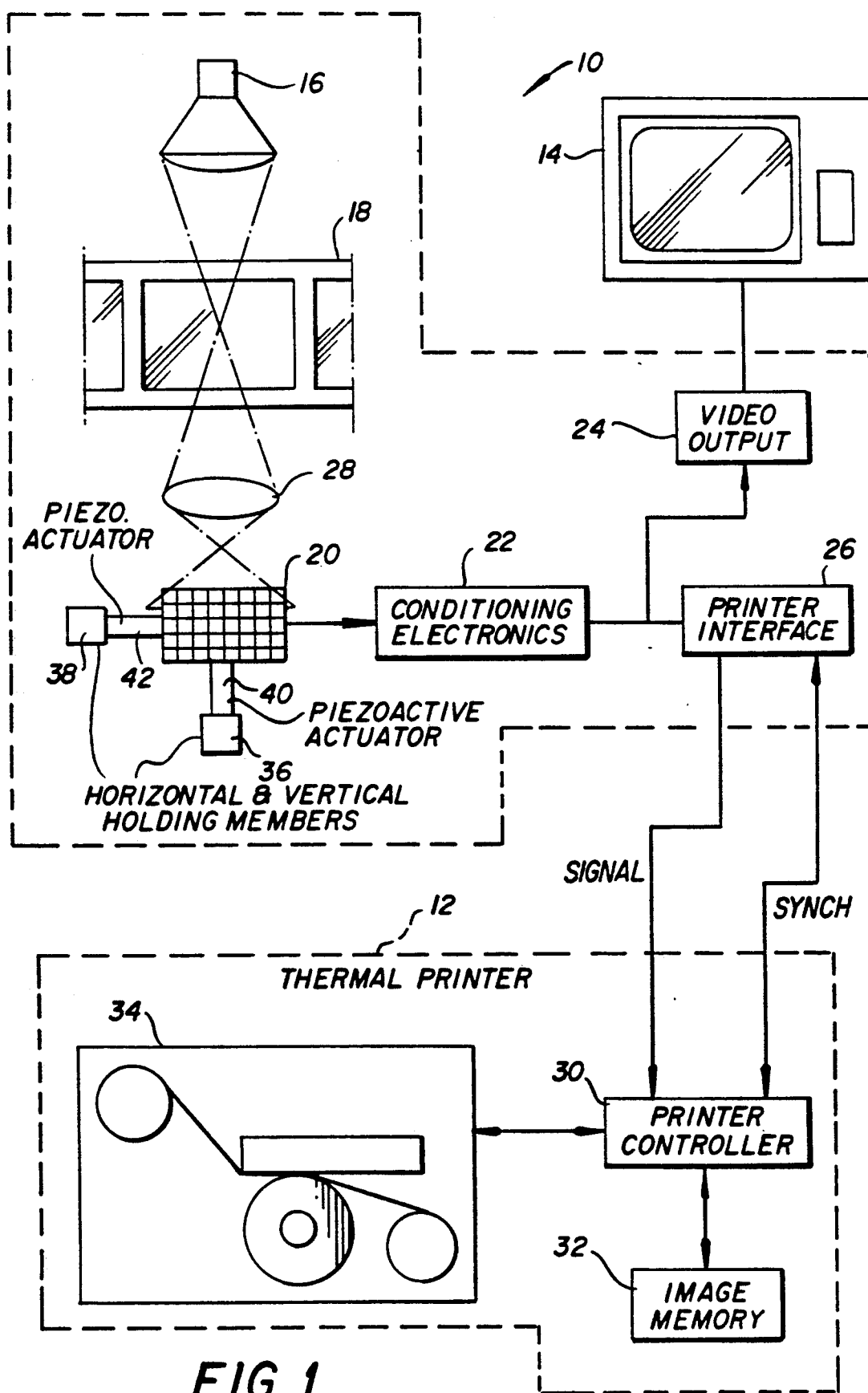
FIG. 1 is a block diagram of a preferred embodiment of an apparatus for producing a high resolution thermal print from a transparency or film negative by dithering in accordance with the present invention.

Referring now to the drawings, in which like numerals indicate like elements throughout the several figures, FIG. 1 is a block diagram of an apparatus for producing a high resolution thermal print from a transparency or film negative by dithering in accordance with the present invention. The apparatus includes an imager 10, a thermal printer 12 and a video monitor 14.

The imager 10 contains a light source 16 that projects light through a transparent image 18, such as 35 mm slides or other transparencies or negatives, for example. The light from the light source 16 is projected through the medium 18 onto a CCD imaging array 20. An output signal from the CCD array 20 is conditioned by conditioning electronics 22 so that a video output 24 is generated from the scanned image 18. The video output 24 delivers a video signal to operate the video monitor 14. Contained within the imager 10 is a printer interface 26 that receives signals from the conditioning electronics 22 to operate the thermal printer 12.

The CCD array 20 contains photodiodes disposed in rows and columns laid out to form an array conforming to a standard video format such as the National Television Systems Committee (NTSC) or PAL. The photodiodes are covered with a color filter array of various patterns that generate color as well as a luminance data. The photodiodes respond to light from the light source 16 that is projected through the image bearing medium 18 and focused onto the imaging array 20 through a focusing lens 28.

The thermal printer 12, as illustrated in FIG. 1, is a standard thermal printer containing a controller 30, an image memory 32 and the printer mechanics 34. Basically, the printer controller 30 receives a video signal from the imager 10 and captures the video signals in the digital memory 32 to make a print using the printer mechanics 34. Because the video signal is an analog signal, the printer 12 embodies analog capture means within the printer controller 30 that is responsive to the video signals and has sufficient storage in the image memory 32 to store the complete signal digitally. The thermal printer 12 then generates thermal hard copy by the sequential deposition of thermal dyes.

The conditioning electronics 22 and the imager 10 is such that image data to the printer interface 26, and thus to the printer 12, is output synchronously to the video output 24.

Still referring to FIG. 1, the method used to generate thermal prints entails projecting a light from the light source 16 through the transparent image 18 onto the CCD array 20 through a focusing lens 28. The conditioning electronics 22 receives information from the CCD array 20 and generates a signal that is coupled to the video output 24 and to the printer interface 26. The signal is a video signal. Where the transparency 18 is a 35 mm film negative, the negative has several times the resolution of the imager 10, which is typically about 500×500 pixels. The resolution is optimized for the video output 24, but the resolution is limited for the thermal printer 12. A typical thermal printer used in an application such as this uses a 6 dot per millimeter head to produce an image on a 3R sheet of paper. The technology does exist to double the pitch of the head to about 12 dots per millimeter which could significantly improve the image quality of the thermal print. But, printing an electronically generated image from a high resolution silver halide negative to a high resolution thermal print is limited by the video interconnect. The present invention removes the limitation on high resolution printing by dithering the imaging array 20 to allow generation of an electronic signal at a resolution higher than standard video.

The CCD array 20 is preferably attached to horizontal and vertical holding members 36, 38. Piezoactive actuators 40, 42 are preferably attached to the CCD array and interposed between the CCD array 20 and the respective horizontal and vertical holding members 36, 38. The CCD array provides four sequential arrays of data that represent four positions of the CCD array generated by one-half step offsets of the CCD array 20 in the horizontal and vertical directions. In one example, a CCD array consisting of 570×489 image elements, in agreement with the one-half inch standard optical system, was moved with piezoactuators 40, 42 that generated two axes of displacement of 0.00050 inches that correspond approximately to a one-half pitch of the imaging elements.

In operation, the imager 10 is responsive to the thermal printing unit 12 so that on command of the user, the imager 10 sequentially actuates the two displacement actuators 40, 42 to provide four frames of information that correspond to the four possible positions that the CCD array 20 could occupy. Because the CCD array 20 is half-stepped, the video signal generated by the CCD array can continue to be displayed without a loss in video image quality. If the video output circuitry 22, 24 is accessed by the printer 12, the resolution capabilities of the analog transmission and reception elements 26, 30 will still limit the quality of image captured by the printer 12. By dithering the CCD array 20 and alerting the printer 12 when the CCD array 20 is in position and then transferring data to the printer 12, each of the four subscans is stored in the printer 12 until a complete image is created.

Alternatively, only the information corresponding to a single color plane is transmitted. After the printer 12 has completed transferring the dye associated with that color plane, the printer 12 signals the imager 10 to transfer the information corresponding to the succeeding color plane. This reduces the amount of data stored in the printer 12 and requires that the image not be moved during the printing process.

Figure 2:
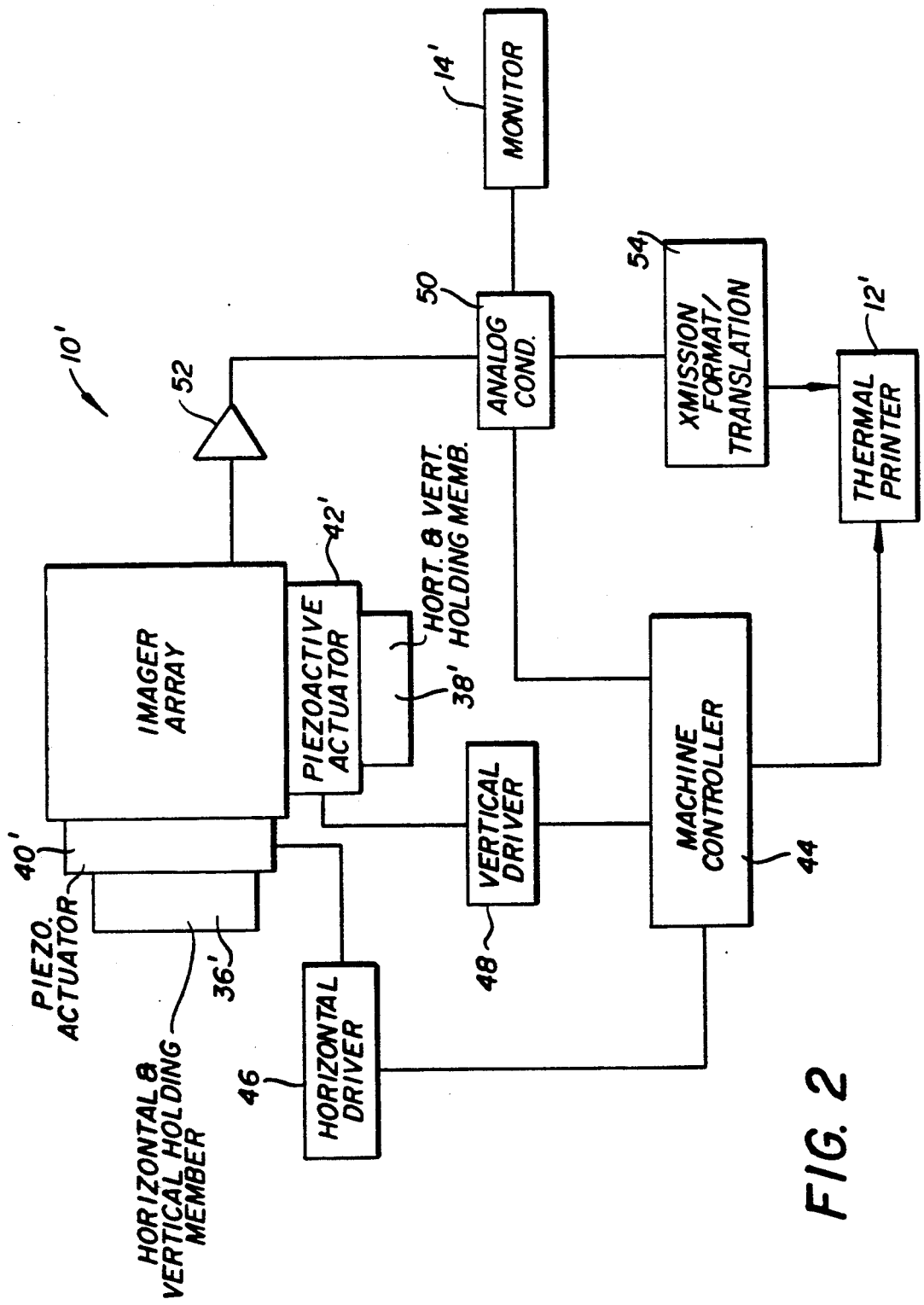
FIG. 2 is a block diagram similar to FIG. 1, but illustrating another preferred embodiment wherein image data for printing is compressed.

Referring now to FIG. 2, the imager 10' is coupled to a thermal printer 12' and a video monitor 14'. The imager array 20' is attached through piezoactuators 40', 42' to holding members 36', 38' that are preferably mutually perpendicular. The imager 10' has a controller 44 that controls a horizontal driver 46 and a vertical driver 48 for actuating the piezoactuators 40' and 42'. The machine controller 44 provides synchronization signals to the thermal printer 12' and a signal to an analog conditioning circuit 50. Also input to the analog conditioning signal 50 is the output from digital to analog converter 52 that delivers data to the analog conditioning circuit 50 from the imager array 20'. The analog conditioning circuit 50 drives the monitor 14' and provides data to a transmission format translation circuit 54 that drives the thermal printer 12'. The horizontal and vertical drivers 46, 48 incrementally step the imager array 20' through the piezoactuators 40' and 42'.

Still referring to FIG. 2, the video monitor 14' ceases to produce a video display in response to the analog conditioning circuit 50 to produce a video signal for the monitor 14'. This occurs when a different scanning mode is entered that facilitates slow speed synchronous printing by the thermal printer 12'. The parameters for exposure of the imager array 20, which may include light intensity and exposure time, are changed to accommodate a new data transfer rate in this different scanning mode. The data transfer from the imager array 20' is transmitted synchronously to the thermal printer 12'. The printer needs only store about two lines of data in a line buffer and does not require a full memory. The imager array 20' provides two interleaved sublines of data to the buffer while the second buffer member provides data for printing. This mode of operation is described more fully in cofiled application for Synchronized Thermal Printing.

Figure 3:
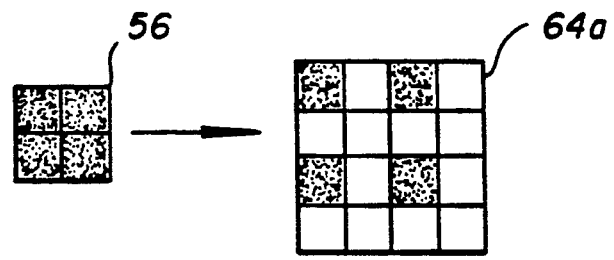
FIGS. 3 through 6 illustrate the storage sequencing of four image frames created by dithering and how it appear in memory in nonoverlapping fashion.

Operation of the present invention is believed to be apparent from the foregoing description and drawings, but a few words will be added for emphasis. FIGS. 3-6 illustrate the stored sequencing of four image frames 56, 58, 60, 62 created by dithering and how they appear in memory 64 in a nonoverlapping fashion. FIG. 3 shows very high resolution data with its corresponding position in memory 64A in the first and third columns and the first and third rows. The area in the memory 64A is shaded the same density as the image frame 56. FIG. 3 would represent the position of the imager array in a normal position when it is not displaced vertically or horizontally by dithering.

Figure 4:
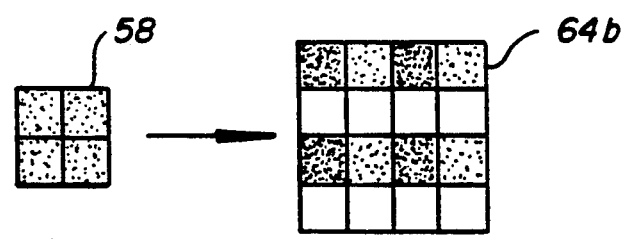

FIG. 4 depicts high density data 58, not as highly dense as data frame 56, but dense and stored shifted one location horizontally in memory 64B from the data of FIG. 3, shown as memory 64A. The high density data occupies the second and fourth columns and the first and third rows. Thus, the data frame 58, when stored in memory 64, occupies a position to the right of data frame 56 and data frame 58 is stored in the memory 64B where it is shifted horizontally but not vertically. Therefore, the memory 64B has two frames of data therein, data frames 56 and 58, occupying the normal nondither position and the dithered position offset horizontally.

Figure 5:
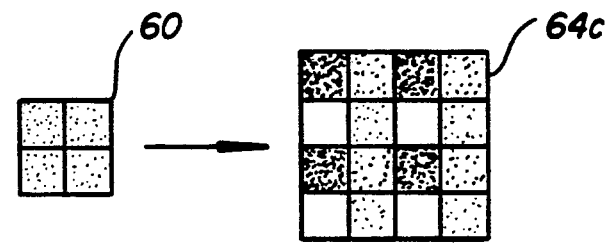

FIG. 5 depicts a low density data frame 60 shifted vertically in memory from the data frames 56 and 58. The data frame 60 occupies the second and fourth columns and the second and fourth rows. Thus, the data frame 60 is stored immediately below data frame 58.

Figure 6:
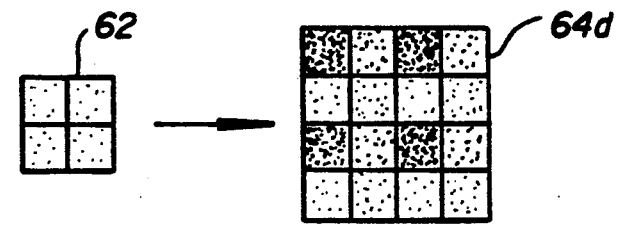

FIG. 6 shows data frame 62, which is a very low density data frame, stored in the memory 64D in a position immediately below data frame 56 and to the left of data frame 60. Thus, the four frames of data are stored in memory without overlapping one another. Data frame 56 occupies the top leftmost position in the memory 64 while data frame 58 occupies the top rightmost position in the memory 64. The lower density data frame 60 occupies the bottom right-hand portion of the memory 64 while the lowest density data frame 62 occupies the bottom leftmost corner of the memory 64.

While there is intermingling of the positions of the data frames stored in the memory, there is no overlap. Dithering effectively changes the shape and location of the imaging elements for improved resolution. Typically, in an imaging sensor, the area sensed and the pitch of the sensing elements is such that when the sensor is moved at a sub-pitch interval, the new image area includes areas of the image that have already been sensed.

When this occurs, there is a corresponding decrease in the resolution of the subscanned image. This problem is eliminated when the sensing elements are spaced far enough apart to prevent this image crosstalk.

It can now be appreciated that there has been presented an apparatus and method for high resolution thermal printing from a hard copy image. The apparatus for generating a high resolution thermal image from a video imager having a plurality of pixels with a preselected pitch comprises means for dithering the video imager at less than the pitch of the pixels and producing arrays of data representing video imager positions generated by partial step offsets of the video imager and the horizontal and vertical directions so that the partial step movement of the video imager causes the pixels to map a new area of an image without overlap of a previously mapped area. The apparatus includes means for transmitting the dithered arrays to a thermal printer so that the printed image contains more information than is generated by a static video imager. The apparatus contains means for generating an electronic signal at a resolution higher than the resolution of a standard video output and includes means for preventing overlap in mapping having sub-pitch mapping areas such that a new image area does not overlap a previously mapped image area. The apparatus also includes means for attaching the video imager to a holding member in two mutually perpendicular directions using piezoactive elements.

The method for generating a high resolution thermal image from a video imager having a plurality of pixels with a preselected pitch comprises dithering the video imager. At less than the pitch of pixels and providing arrays of data representing video imager positions generated by partial step offsets of the video imager in the horizontal and vertical directions so that the partial step movement of the video imager causes the pixels to map a new area of an image without overlap of a previously mapped area. The dithered arrays are transmitted to the thermal printer so that the printed image contains more information than is generated by a static video imager. The video imager is attached to a holding member in two mutually perpendicular directions using piezoactive elements and generating two axes of displacement. Overlap in mapping areas is prevented by having sub-pitch mapping areas such that a new image area does not overlap a previously mapped image area.

While the invention has been described with particular reference to the preferred embodiments, it will be understood by those skilled in the art that various changes may be made and equivalents may be substituted for elements of the preferred embodiment without departing from invention. For example, while dithering has been described with reference to half-steps, other incremental steps could be used with overlap of mapping areas. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. For example, while the invention has been described with reference to a silver halide transparency, the invention works equally with a high resolution photographic negative such a developed negative from a 35 mm camera or other device. It is accordingly intended that the claims shall cover all such modifications and applications as do not depart from the true spirit and scope of the invention.

What is claimed is:

1. A method for generating a high resolution thermal image from a video imager having a plurality of pixels with a preselected pitch, comprising the step of:
   dithering said video imager at less than the pitch of said pixels and providing arrays of data representing video imager positions generated by partial step offsets of said video imager in horizontal and vertical directions so that said partial step movement of the video imager causes said pixels to map a new horizontal and vertical area of an image without overlap of a previously mapped area.

2. A method, as set forth in claim 1, including the step of transmitting the dithered arrays to a thermal printer so that the thermal image contains more information than is generated by a static video imager.

3. A method, as set forth in claim 1, including the step of preventing overlap in mapping by having subpitch mapping areas such that a new image area does not overlap a previously mapped image area.

4. A method, as set forth in claim 1, including the step of dithering the video imager to allow generation of an electronic signal at a resolution higher than a standard video resolution.

5. A method, as set forth in claim 1, including the step of attaching said video imager to a holding member in two mutually perpendicular directions using piezoelectric elements and generating two axes of displacement.

6. A method, as set forth in claim 1, including the step of providing partial steps that are half steps.

7. A method, as set forth in claim 1, including the step of providing arrays of data that are sequential arrays.

8. A method, as set forth in claim 7, including the step of providing four sequential arrays.

9. An apparatus for generating a high resolution thermal image from a video imager having a plurality of pixels with a preselected pitch, comprising:
   means for dithering said video imager at less than the pitch of said pixels and producing arrays of data representing video imager positions generated by partial offsets of said video imager in horizontal and vertical directions so that a partial step movement of the video imager causes said pixels to map a new horizontal and vertical area of an image without overlap of a previously mapped area said video imager coupled to said means.

10. An apparatus, as set forth in claim 9, including means for transmitting the dithered arrays to a thermal printer so that the thermal image contains more information than is generated by a static video imager.

11. An apparatus, as set forth in claim 9, including means for preventing overlap in mapping by having sub-pitch mapping areas.

12. An apparatus, as set forth in claim 9, including means for generating an electronic signal at a resolution higher than a standard video resolution.

13. An apparatus, as set forth in claim 9, including means for attaching said video imager to a holding member in two mutually perpendicular directions using piezoactive elements for movement in two mutually perpendicular directions.

14. An apparatus, as set forth in claim 9, wherein said partial step movement occurs in half step increments.

15. An apparatus, as set forth in claim 9, wherein said arrays of data are sequentially generated arrays.

16. An apparatus, as set forth in claim 9, wherein there are four sequential arrays two of which are generated by horizontal movement of said video imager and two of which are generated by vertical movement of said video imager.

17. An apparatus for generating a high resolution thermal image from a video imager having a plurality of pixels with a preselected pitch, comprising:

means for dithering said video imager at less than the pitch of said pixels and producing four sequential arrays of data representing four video imager positions generated by half step offsets of said video imager in horizontal and vertical directions; and storage means for receiving said four arrays of data and intermingling positions of said four arrays of data without overlapping said positions so that half step movement of the video imager causes said pixels to map a new area of an image without overlap of a previously mapped area.

* * * * *